United States Patent
Vinay et al.

(10) Patent No.: US 10,489,498 B2
(45) Date of Patent: Nov. 26, 2019

(54) DIGITAL DOCUMENT UPDATE

(71) Applicant: Adobe Inc., San Jose, CA (US)

(72) Inventors: Vishwa Vinay, Bangalore (IN); Sopan Khosla, Kapurthala (IN); Sanket Vaibhav Mehta, Pune (IN); Sahith Thallapally, Karimnagar (IN); Gaurav Verma, Pathankot (IN)

(73) Assignee: Adobe Inc., San Jose, CA (US)

( * ) Notice: Subject to any disclaimer, the term of this patent is extended or adjusted under 35 U.S.C. 154(b) by 51 days.

(21) Appl. No.: 15/897,059

(22) Filed: Feb. 14, 2018

(65) Prior Publication Data
US 2019/0251150 A1 Aug. 15, 2019

(51) Int. Cl.
| | | |
|---|---|---|
| *G06F 17/27* | (2006.01) | |
| *G06F 17/24* | (2006.01) | |
| *G06F 9/451* | (2018.01) | |
| *G06N 20/00* | (2019.01) | |
| *G06F 16/93* | (2019.01) | |
| *G06F 16/332* | (2019.01) | |

(52) U.S. Cl.
CPC .............. *G06F 17/24* (2013.01); *G06F 9/451* (2018.02); *G06F 16/3323* (2019.01); *G06F 16/93* (2019.01); *G06F 17/278* (2013.01); *G06N 20/00* (2019.01)

(58) Field of Classification Search
CPC ....................................................... G06F 17/02
USPC ........................... 704/1, 9, 10, 257, 270–275
See application file for complete search history.

(56) References Cited

U.S. PATENT DOCUMENTS

| | | | | |
|---|---|---|---|---|
| 6,002,867 A * | 12/1999 | Jazdzewski | ............... | G06F 8/34 717/105 |
| 6,314,397 B1 * | 11/2001 | Lewis | ........................ | G06F 3/16 704/235 |
| 8,346,620 B2 * | 1/2013 | King | ........................ | G06Q 30/02 705/26.1 |
| 2002/0129053 A1 * | 9/2002 | Chan | ..................... | G06F 17/246 715/213 |
| 2006/0136352 A1 | 6/2006 | Brun et al. | | |
| 2007/0156745 A1 | 7/2007 | Harrington | | |
| 2008/0052684 A1 | 2/2008 | Bowdidge et al. | | |

(Continued)

OTHER PUBLICATIONS

"Create dynamic PDF documents in Adobe InDesign", Retrieved at: https://helpx.adobe.com/indesign/using/dynamic-pdf-documents.html—on Nov. 2, 2017, 10 pages.

(Continued)

*Primary Examiner* — Jesse S Pullias
(74) *Attorney, Agent, or Firm* — SBMC (57) ABSTRACT

Techniques and systems are described in which a document management system is configured to update content of document portions of digital documents. In one example, an update to the digital document is initially triggered by a document management system by detecting a triggering change applied to an initial portion of the digital document. The document management system, in response to the triggering change, then determines whether trailing changes are to be made to other document portions, such as to other document portions in the same digital document or another digital document. To do so, triggering and trailing change representations are generated and compared to determine similarity of candidate document portions with an initial document portion.

20 Claims, 8 Drawing Sheets

(56) References Cited

U.S. PATENT DOCUMENTS

| | | | |
|---|---|---|---|
| 2009/0076792 | A1* | 3/2009 | Lawson-Tancred ........................ G06F 17/212 704/2 |
| 2011/0078165 | A1 | 3/2011 | Battle et al. |
| 2012/0151312 | A1 | 6/2012 | Clee et al. |
| 2013/0326349 | A1 | 12/2013 | Mehalingam et al. |
| 2014/0164315 | A1 | 6/2014 | Golshan |
| 2014/0279729 | A1* | 9/2014 | Delaney .............. G06F 17/2785 706/12 |
| 2014/0351788 | A1 | 11/2014 | Bienkowski et al. |
| 2019/0155880 | A1 | 5/2019 | Vinay et al. |

OTHER PUBLICATIONS

"Creating and Managing Content Fragments", Retrieved at: https://helpx.adobe.com/experience-manager/6-2/assets/using/content-fragments.html—on Nov. 2, 2017, 19 pages.

Georgescu,"Extracting Event-Related Information from Article Updates in Wikipedia", ECIR 2013, Mar. 24, 2013, 12 pages.

Kenter,"Siamese CBOW: Optimizing Word Embeddings for Sentence Representations", Proceedings of the 54th Annual Meeting of the Association for Computational Linguistics, 2016, Aug. 7, 2016, pp. 941-951.

Levy,"Dependency-Based Word Embeddings", Proceedings of the 52nd Annual Meeting of the Association for Computational Linguistics (Short Papers), 2014, Apr. 25, 2014, pp. 302-308.

Liu,"A Sentence Interaction Network for Modeling Dependence between Sentences", Proceedings of the 54th Annual Meeting of the Association for Computational Linguistics, Aug. 7, 2016, pp. 558-567.

Mikolov,"Efficient estimation of word representations in vector space", arXiv preprint arXiv:1301.3781 (2013), Sep. 7, 2013, 12 pages.

Palangi,"Deep Sentence Embedding Using Long Short-Term Memory Networks: Analysis and Application to Information Retrieval", EEE/ACM Transactions on Audio, Speech, and Language Processing, Jan. 16, 2016, 25 pages.

Schuhmacher,"Knowledge-based Graph Document Modeling", WSDM '14 Proceedings of the 7th ACM international conference on Web search and data mining, Feb. 28, 2014, 10 pages.

Tai,"Improved Semantic Representations From Tree-Structured Long Short-Term Memory Networks", ACL 2015, Jul. 26, 2015, pp. 1556-1566.

Yu,"Deep Learning for Answer Sentence Selection", CoRR 2014, Dec. 4, 2014, 9 pages.

Zhong,"Aligning Knowledge and Text Embeddings by Entity Descriptions", EMNLP 2015, Sep. 17, 2015, pp. 267-272.

"Personalizing content", Retrieved at: https://webhelp.episerver.com/15-2/EN/Content/EN/CMS%20Edit/Edit_Personalization.htm—on Apr. 17, 2018, 2 pages.

"Sitecore Documentation: Edit the website content", Retrieved at: https://doc.sitecore.net/sitecore_experience_platform/content_authoring/creating_and_editing_items/editing/edit_the_website_content—on Apr. 17, 2018, 5 pages.

"Web Content Management | Acquia", Retrieved at: https://www.acquia.com/solutions/web-content-management—on Apr. 17, 2018, 6 pages.

"Wysiwyg | Drupal.org", Retrieved at: https://www.drupal.org/project/wysiwyg—on Apr. 17, 2018, 2 pages.

Abustan,"Gibane Group Research Report: Smart Content in the Enterprise", Sep. 7, 2010, 2 pages.

Bock,"Smart Content in the Enterprise—How Next Generation XML Applications Deliver New Value to Multiple Stakeholders", Aug. 2010, 87 pages.

Chu,"Katara: A Data Cleaning System Powered by Knowledge Bases and Crowdsourcing", Proceedings of the 2015 ACM SIGMOD International Conference on Management of Data, May 27, 2015, 15 pages.

Gehrmann,"Deploying AI Methods to Support Collaborative Writing: a Preliminary Investigation", May 21, 2015, 8 pages.

Hoffart,"YAGO2: A spatially and temporally enhanced knowledge base from Wikipedia", Artificial Intelligence vol. 194, Jan. 2013, 28 pages.

Kasneci,"NAGA: Harvesting, Searching and Ranking Knowledge", SIGMOD Conference2008, Jun. 12, 2008, 3 pages.

MacComascaigh,"Magic Quadrant for Web Content Management", Sep. 28, 2016, 32 pages.

Neuwirth,"Flexible Diff-ing in a Collaborative Writing System", Nov. 1992, 8 pages.

Tschuggnall,"Overview of the Author Identification Task at PAN-2017: Style Breach Detection and Author Clustering", Dec. 2017, 22 pages.

Zhu,"CEPT: Collaborative Editing Tool for Non-Native Authors", Feb. 25, 2017, 13 pages.

"Pre-Interview First Office Action", U.S. Appl. No. 15/821,468, dated Aug. 2, 2019, 16 pages.

"First Action Interview Office Action", U.S. Appl. No. 15/821,468, dated Sep. 16, 2019, 15 pages.

* cited by examiner

DIGITAL DOCUMENT UPDATE

BACKGROUND

Digital documents are an integral part of the digital content revolution to retain information, both personal and in the enterprise. Digital documents, for instance, may be configured in a variety of ways to represent a diverse range of information, such as through a word processing document to record text, spreadsheets to record numbers and numerical relationships, presentations that serve as a basis for lectures and notes, digital images of artworks, webpages, blogs, and so forth.

Creation and use of digital documents typically follows a lifecycle of planning, creation, publishing, and managing of the digital documents. Conventional techniques and systems focus on planning, creation, and publishing of the digital documents. Thus, these conventional techniques focus on how to create the digital documents as well as how to make these digital documents available to others. However, conventional techniques and systems do not address the maintenance of the digital documents.

As described above, digital documents are one of the primary techniques used to retain information. This information, however, may become stale and outdated over time and therefore cause the digital document to lack relevancy. This may become especially problematic for digital documents that are made available via a network (e.g., a weblog via the Internet) because these documents may remain available to users even when the information contained within the documents is no longer valid. Thus, failure of conventional digital document techniques to address maintenance of digital documents limit applicability and accuracy of these documents, especially within a digital medium environment such as the Internet.

SUMMARY

Techniques and systems are described in which a document management system is configured to update content of document portions of digital documents. Hereinafter, document portions are also referred to as "portions." In one example, an update to the digital document is initially triggered by a document management system by detecting a triggering change applied to an initial portion of the digital document. The triggering change may be based on receipt of a manual user input by the document management system or based on a change to a document repository that is detected by the document management system, e.g., using natural language processing as part of machine learning.

The document management system, in response to the triggering change, then determines whether trailing changes are to be made to other document portions, such as to other document portions in the same digital document or another digital document. To do so, a triggering change representation is generated by the document management system based on the initial document portion that is a subject of the triggering change. The triggering change representation, for instance, may be generated as a numerical representation (e.g., vector) based on a bag-of-words technique, embedding (e.g., vector embedding), natural language processing, and so on.

Trailing change representations are also generated by the document management system based on candidate document portions, which may also be generated as a numerical representation (e.g., vector) based on a bag-of-words technique, embedding, natural language processing, and so on. As described above, the candidate document portions may be taken from a same digital document having the initial document portion or a different digital document.

The document management system then generates similarity scores by comparing the triggering change representation to respective ones of the plurality of candidate trailing change representations, e.g., through Euclidean distance, cosine similarity, and so forth. In this way, similarity of the initial document portion may be determined efficiently in real time by the document management system to respective ones of a multitude of candidate document portions, which is not possible to be performed by a human due to the quantity of candidates.

This similarity may then be used by the document management system to control document updates. In one example, the candidate document portions are output in a user interface by the document management system in a ranked order of similarity. Options are included in the user interface that are user selectable to then cause the triggering changes to be made to respective document portions. In this way, the user is able to identify and change a multitude of candidate document portions in an efficient manner that otherwise would not be possible to be performed manually by the user. In another example, the document management system is configured to make the changes automatically and without user intervention using natural language processing techniques.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Conventional digital document techniques and systems focus on the creation and publication of digital documents, and do not address how to maintain information of the digital documents over time. Consequently, conventional techniques and systems may limit applicability and accuracy of these digital documents.

Accordingly, techniques and systems are described in which a document management system is configured to update content of digital documents. To do so, a document update module of a document management system detects a triggering change to an initial document portion. In one example, the document management system detects the change in response to a manual user input, e.g., through user interaction with a user interface as part of a document editor to make a change to the initial document portion. In another example, the document management system detects the change automatically and without user intervention by detecting a change in a document repository that involves content in the initial document portion, e.g., through natural language processing using machine learning.

The document update module also determines whether a trailing change is to be made to that portion of other portions of the digital document based on the triggering change. The trailing change, for instance, is a change made to another portion in the digital document or another digital document based on the triggering change. This helps to promote factual, logical, linguistic, and/or naming consistency between these portions.

To make this determination, the document management system generates a triggering change representation based on the initial document portion that is a subject of the triggering change, e.g., before or after application of the triggering change as further described below. The triggering change representation, for instance, may be generated as a numerical representation (e.g., vector) based on a bag-of-words technique, embedding, natural language processing, and so on. Trailing change representations are also generated by the document management system based on candidate document portions. This may also be generated by the document management system as a numerical representation (e.g., vector) based on a bag-of-words technique, embedding, natural language processing, and so on. The candidate document portions may originate from the same digital document or other digital documents, e.g., other webpages of a website.

The document management system then generates similarity scores by comparing the triggering change representation to respective ones of the plurality of trailing change representations, e.g., through use of Euclidean distance, cosine similarity, through a model generated using machine learning, and so on. In this way, similarity of the initial document portion may be determined efficiently in real time to respective ones of the plurality of candidate document portions. This similarity may then be used by the document management system to control document updates. In one example, the candidate document portions are output in a user interface by the document management system in a ranked order of similarity. Options are included in the user interface in this example that are user selectable to then cause the triggering changes to be made to respective document portions. In this way, the user is able to identify and change a multitude of candidate document portions in an efficient manner that otherwise would not be possible to be performed manually by the user. In another example, the document management system is configured to make the changes automatically and without user intervention using natural language processing techniques.

This is not possible using conventional techniques, including conventional artificial intelligence techniques that generate a unique instance of a digital document to describe content as a whole. For example, artificial intelligence may be used to generate a summary of a subject, e.g., from a data repository. Conventional techniques to do so generated this summary "from scratch" each time, and therefore each summary is considered a snapshot of the information at a corresponding point in time. Therefore, these summaries are not updated, but rather a unique instance is created each time and thus suffered from the challenges of other conventional techniques that generated a new version of a digital document when an older version became outdated. Further discussion of digital document update techniques is described in the following sections and shown in corresponding figures.

In the following discussion, an example environment is described that may employ the techniques described herein. Example procedures are also described which may be performed in the example environment as well as other environments. Consequently, performance of the example procedures is not limited to the example environments and the example environment is not limited to performance of the example procedures.

Example Environment

Figure 1:
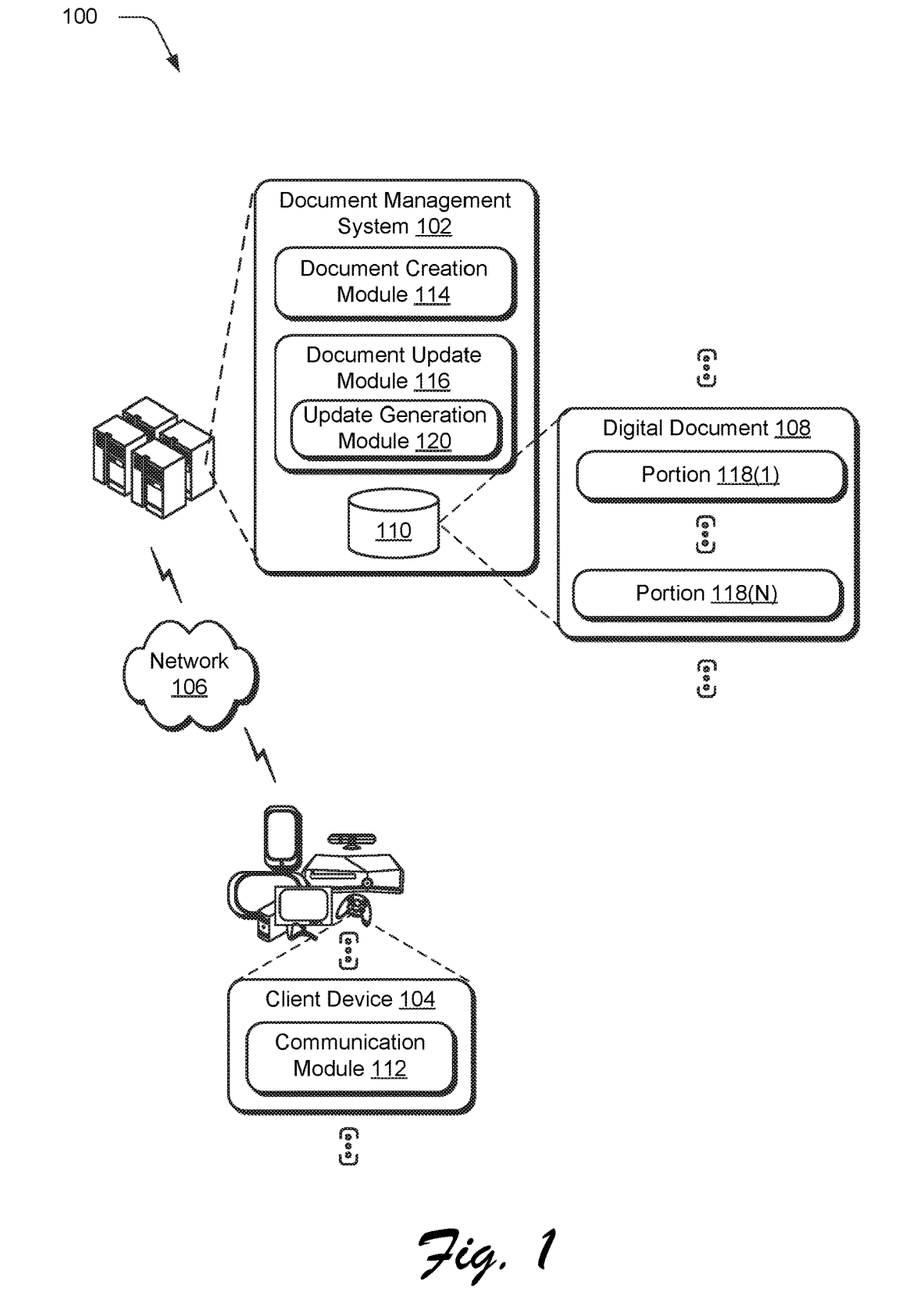
FIG. 1 is an illustration of an environment in an example implementation that is operable to employ digital document update techniques.

FIG. 1 is an illustration of a digital medium environment 100 in an example implementation that is operable to employ digital document update techniques described herein. The illustrated environment 100 includes a document management system 102 and client device 104 of a plurality of client devices that are communicatively coupled, one to another, via a network 106. The document management system 102 and client device 104 are implemented via a computing device, which may be configured in a variety of ways.

A computing device, for instance, may be configured as a desktop computer, a laptop computer, a mobile device (e.g., assuming a handheld configuration such as a tablet or mobile phone as illustrated), and so forth. Thus, a computing device may range from full resource devices with substantial memory and processor resources (e.g., personal computers, game consoles) to a low-resource device with limited memory and/or processing resources (e.g., mobile devices). Additionally, although a single computing device is discussed, a computing device may be representative of a plurality of different devices, such as multiple servers utilized by a business to perform operations "over the cloud" as illustrated for the document management system as described in relation to FIG. 8.

The document management system 102 is configured to manage creation, publication, and maintenance of a digital document 108, which is illustrated as stored in a storage device 110. The digital document 108 may be configured in a variety of ways. Examples of digital document 108 configurations include a word processing document to record text, spreadsheets to record numbers and numerical relationships, presentations that serve as a basis for lectures and notes, digital images of artworks, webpages, blogs, and so forth. Functionality may be implemented locally by the document management system 102 and/or remotely, e.g., through access by a communication module 112 such as a mobile application or browser of the client device 104 via the network 106.

To do so, the document management system 102 includes a document creation module 114 and a document update module 116. The document creation module 114 includes functionality to create and edit the digital document 108. This functionality may include a user interface to enter text, configure a layout, create images, slides, audio, sheets, and so forth. The document update module 116 is configured to update the digital document 108, such as to address changes in information described by content of the digital document 108 over time.

The document creation module 114, for instance, may receive user inputs to create a plurality of portions 118(1)-118(N), e.g., text, images, graphs, illustrations, and so forth. At a later point in time, user inputs may also be received to edit one or more of the portions. The initial change to a portion of the digital document 108 is referred to as a triggering change in the following discussion.

The update generation module 120 also determines whether additional changes are to be made to that portion or other portions of the digital document 108 or another digital document, which are referred to as trailing changes. To do so, the update generation module 120 determines similarity (e.g., before and/or after application of the triggering change) of the initial document portion to candidate document portions, which may originate from the same digital document 108 or another digital document. Based on this similarity, the update generation module 120 may control which trailing changes, if any, are made to the candidate document portions based on the triggering change. This may be performed in order to maintain factual accuracy, logical consistency, linguistic correctness, and stylistic continuity. The update generation module 120 may make this determination iteratively such that a triggering change may affect other triggering changes to other portions of the digital document 108. In this way, the update may be used to maintain accuracy of content included in the digital document 108. In the following discussion, a digital document update control section describes operation of the document update module in greater detail. Another section follows that describes operation of a trailing change module to identify trailing changes based on a triggering change.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Digital Document Update Control

Figure 2:
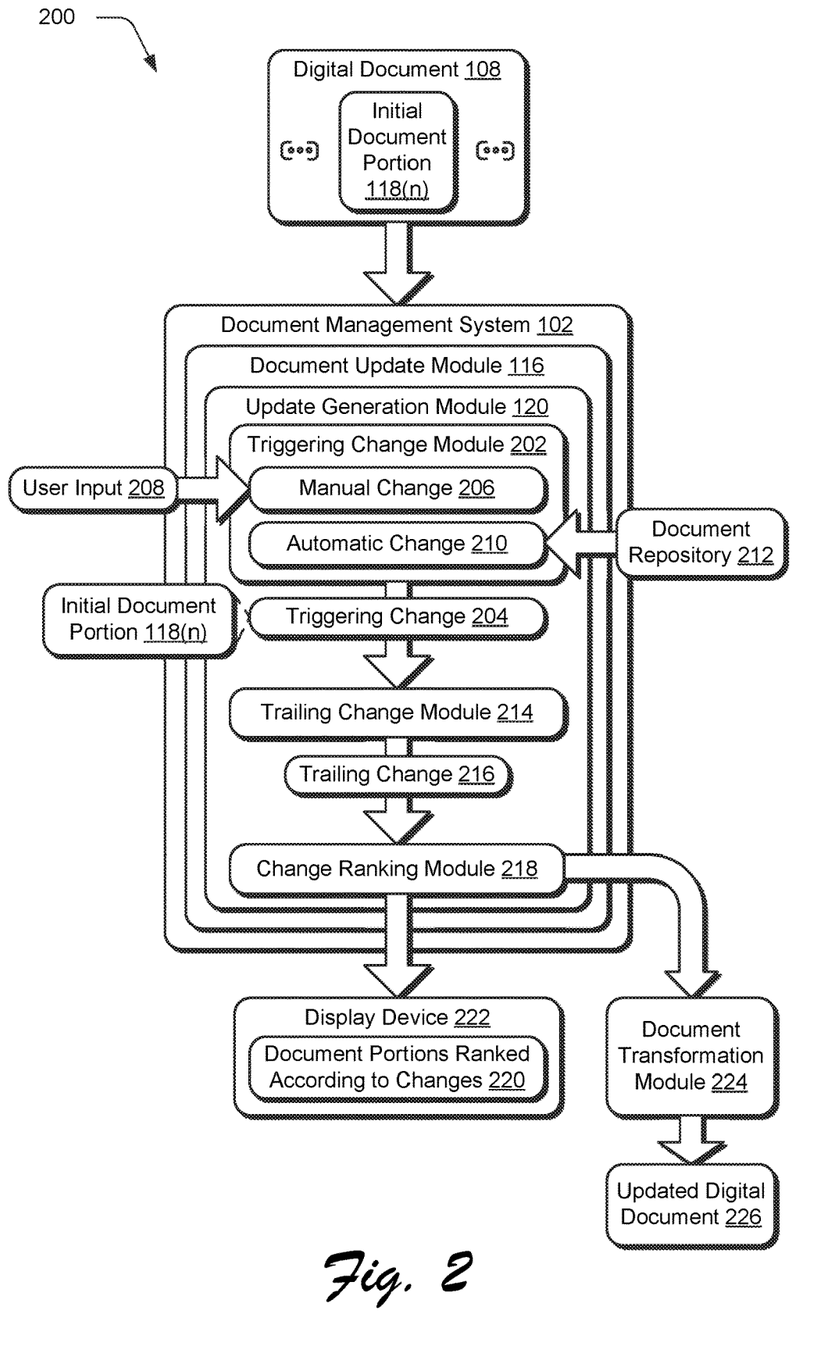
FIG. 2 depicts a system in an example implementation in which a digital document having associated tags is updated.
Figure 3:
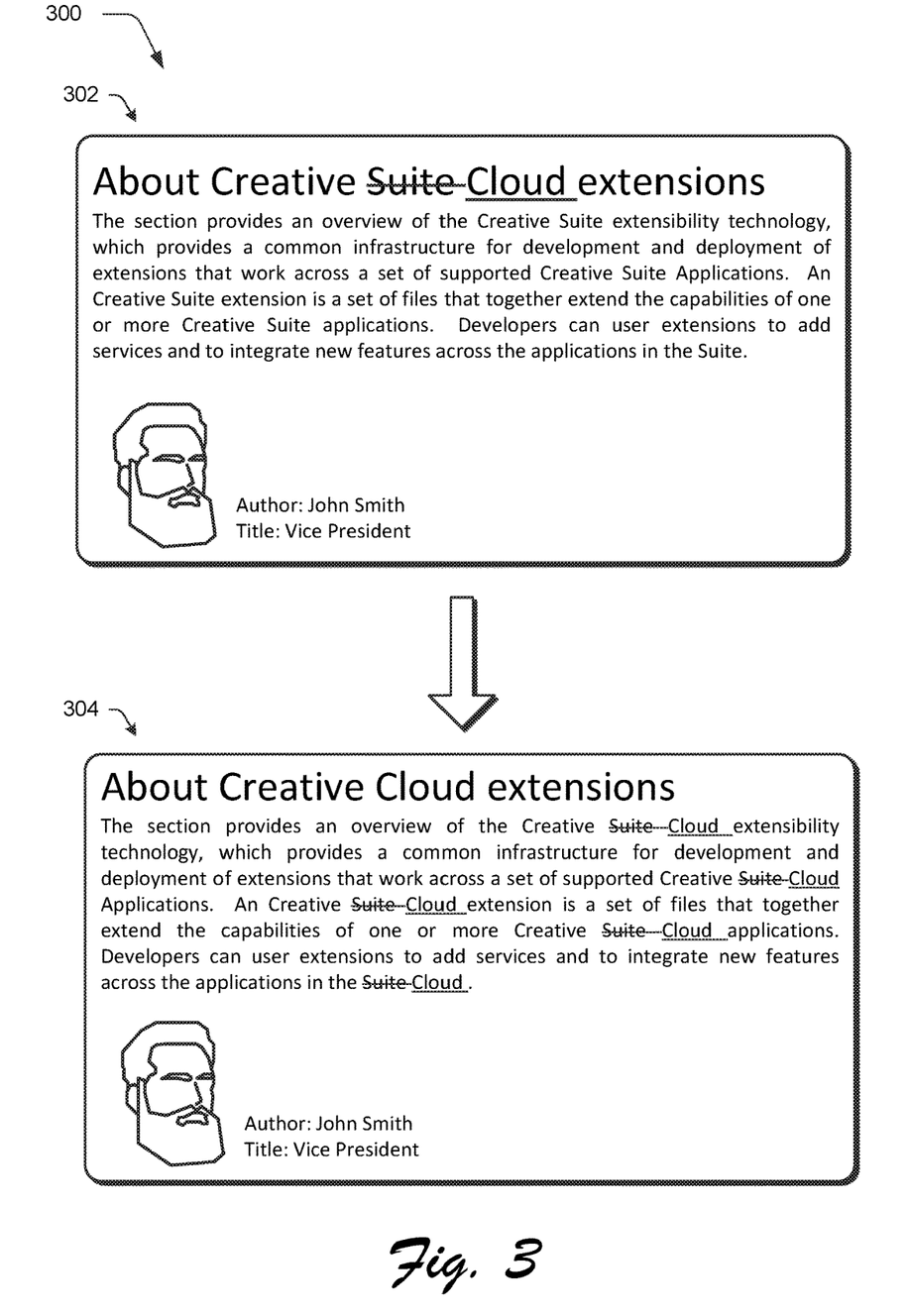
FIG. 3 depicts an example implementation of triggering and trailing changes.
Figure 4:
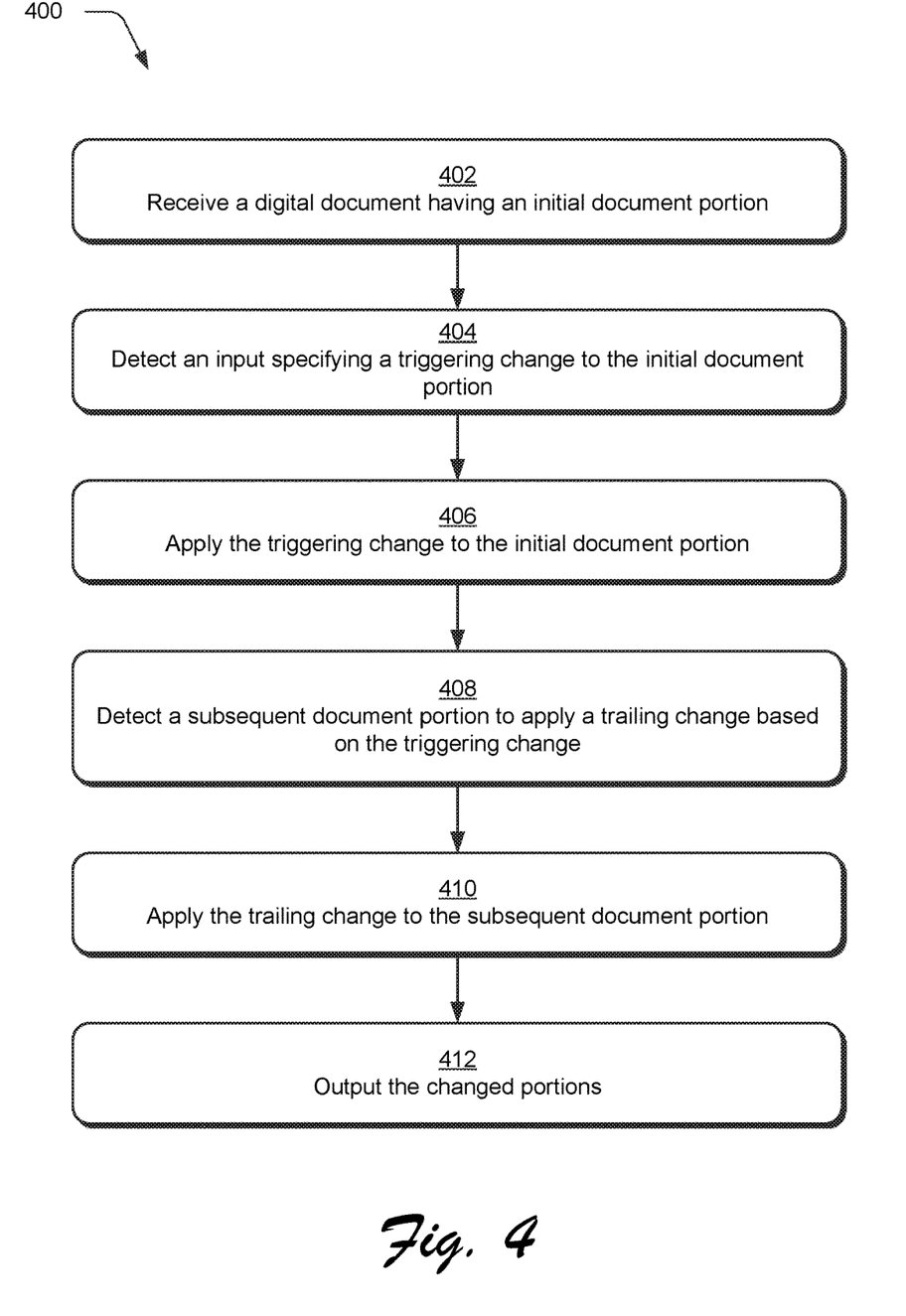
FIG. 4 is a flow diagram depicting a procedure in an example implementation of update of the digital document of FIGS. 2 and 3 using triggering and trailing changes to respective portions of the document.

FIG. 2 depicts a system 200 in an example implementation in which a digital document update is performed using triggering and trailing changes. FIG. 3 depicts an example implementation 300 of triggering and trailing changes. FIG. 4 depicts a procedure 400 in an example implementation of digital document update using triggering and trailing changes to respective portions of the digital document.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 2-4.

In this example, the document update module 116 receives the digital document 108, e.g., from the storage device 110, that includes a plurality of document portions, an example of which is illustrated as initial document portion 118(n). A triggering change module 202 of the update generation module 120 then detects an input specifying a triggering change 204 to the initial document portion 118(n) (block 404). A triggering change may be detected by the triggering change module 202 in a variety of ways. A manual change 206, for instance, may be detected based on a user input 208 to the initial document portion 118(n). As shown at a first stage 302 of an example implementation 300 of FIG. 3, for instance, a user input 208 is received to a title portion to change from "creative suite" to "creative cloud." This manual change 206 is then detected by the triggering change module 202 as involving a change to the initial document portion 118(n). As part of this, the triggering change 204 is then applied to the initial document portion 118(n) of the digital document 108 (block 406).

In another example, the triggering change module 202 is configured to detect the triggering change 204 as an automatic change 210 automatically and without user intervention. The triggering change module 202, for instance, may be configured to perform natural language processing using machine learning. One example of natural language processing is natural language understanding (NLU), which is tasked with understanding "what" is included within the natural language.

To do so, the triggering change module 202 includes functionality to address diverse syntax through use of a lexicon, a parser, and grammar rules to break a series of text (e.g., initial document portion 118(n) of the digital document 108) into an internal representation. The internal representation, for instance, may be configured as a numerical representation through use of a bag-of-words technique, embeddings, machine learning, and so forth. This internal representation may then be compared with similarly generated internal representations of content from a document repository 212 to determine if the portion is to be changed. The document repository 212, for instance, may be associated with an enterprise, a collection of a user's personal digital documents 108, and so forth. Through comparison of these representations, the triggering change module 202 may determine which changes to the document repository 212, if any, are relevant to the initial document portion 118(n) that is changed via the triggering change 204, e.g., through comparison of the internal representations. The triggering change 406 is then made to the digital document 108, e.g., automatically and without user intervention by the triggering change module 202 in this example.

Regardless of how the triggering change 204 is detected, a trailing change module 214 is then employed to detect whether to change a subsequent document portion using a trailing change 216 (block 408) based on the triggering change 406. In this example, the trailing change is then applied to the subsequent portion automatically and without user intervention (block 410), which is then output (block 412). Other examples are also contemplated, such as output in a ranked order as further described below.

Like the previous example, the trailing change module 214 may include functionality to address diverse syntax through use of a lexicon, a parser, and grammar rules to break a series of text (e.g., initial document portion 118(n) of the digital document 108) into an internal representation. The internal representation, for instance, may be configured as a numerical representation through use of a bag-of-words technique, embeddings, machine learning, and so forth as further described in relation to FIGS. 5-7. This internal representation may then be compared by the trailing change module 214 with similarly generated internal representations of other document portions, hereinafter referred to as candidate document portions, to determine if the candidate document portions are to be changed. Through comparison of these representations, the trailing change module 214 may determine whether the triggering change 204 made to the initial document portion 118(n) is relevant to the candidate document portions.

In this way, the trailing change module 214 is configured to ensure that other portions of the digital document 108 or other digital document are consistent with the triggering change 204. As shown in the example of FIG. 3, for instance, a triggering change made in the first stage 302 from "Creative Suite" to "Creative Cloud" causes subsequent trailing changes to be made to the digital document as shown at the second stage 304.

In the illustrated example system 200 of FIG. 2, the trailing change module 214 is configured to apply the trailing changes 216 iteratively such that one trailing change may cause another trailing change. These trailing changes 216 are then output to a change ranking module 218 that is configured to rank the trailing changes 216. The ranking, as further described in the following section, may be based on similarity scores generated through comparison of the internal representations above to each other, e.g., a representation of the initial document portion 118(n) to representations of the candidate document portions. The ranking may then be employed in a variety of ways, such as to automatically apply the highest ranked change, output in a user interface for user selection, and so forth. In a first example, the ranking is employed to output candidate document portions ranked according to changes 220 for display by a display device 222.

A user interface, for instance, may output (block 412) corresponding candidate document portions having suggested trailing changes 216. An option may then be provided that is user selectable to make the change. In this way, the document management system 102 supports functionality to enable users to quickly locate and confirm trailing changes 216, which is not possible using conventional techniques. In another example, the similarity scores and corresponding rankings are used to indicate a degree in confidence in a corresponding trailing change 216. Therefore, similarity scores indicating at least a threshold amount of similarity may be used to cause a document transformation module 224 to generate an updated digital document 226, automatically and without user intervention, having the triggering change 204 and any trailing changes 216 that are above this threshold amount. This may be performed in a variety of ways, such as through natural language processing and understanding techniques. Further discussion of operation of the trailing change module 214 and ranking is described in the following section.

Trailing Changes Determination and Rankings

Figure 5:
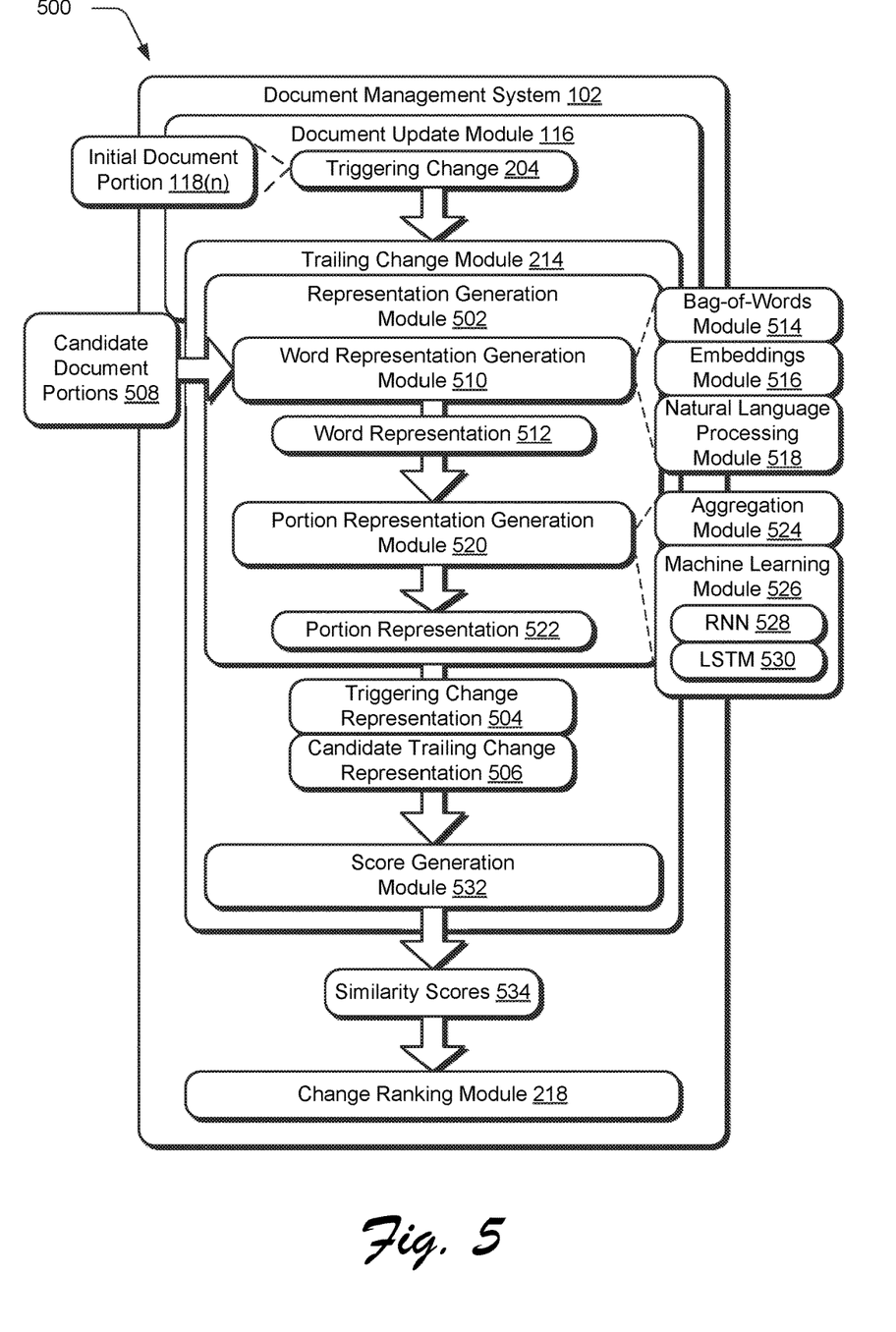
FIG. 5 depicts a system in an example implementation showing operation of a trailing change module of FIG. 3 in greater detail.
Figure 6:
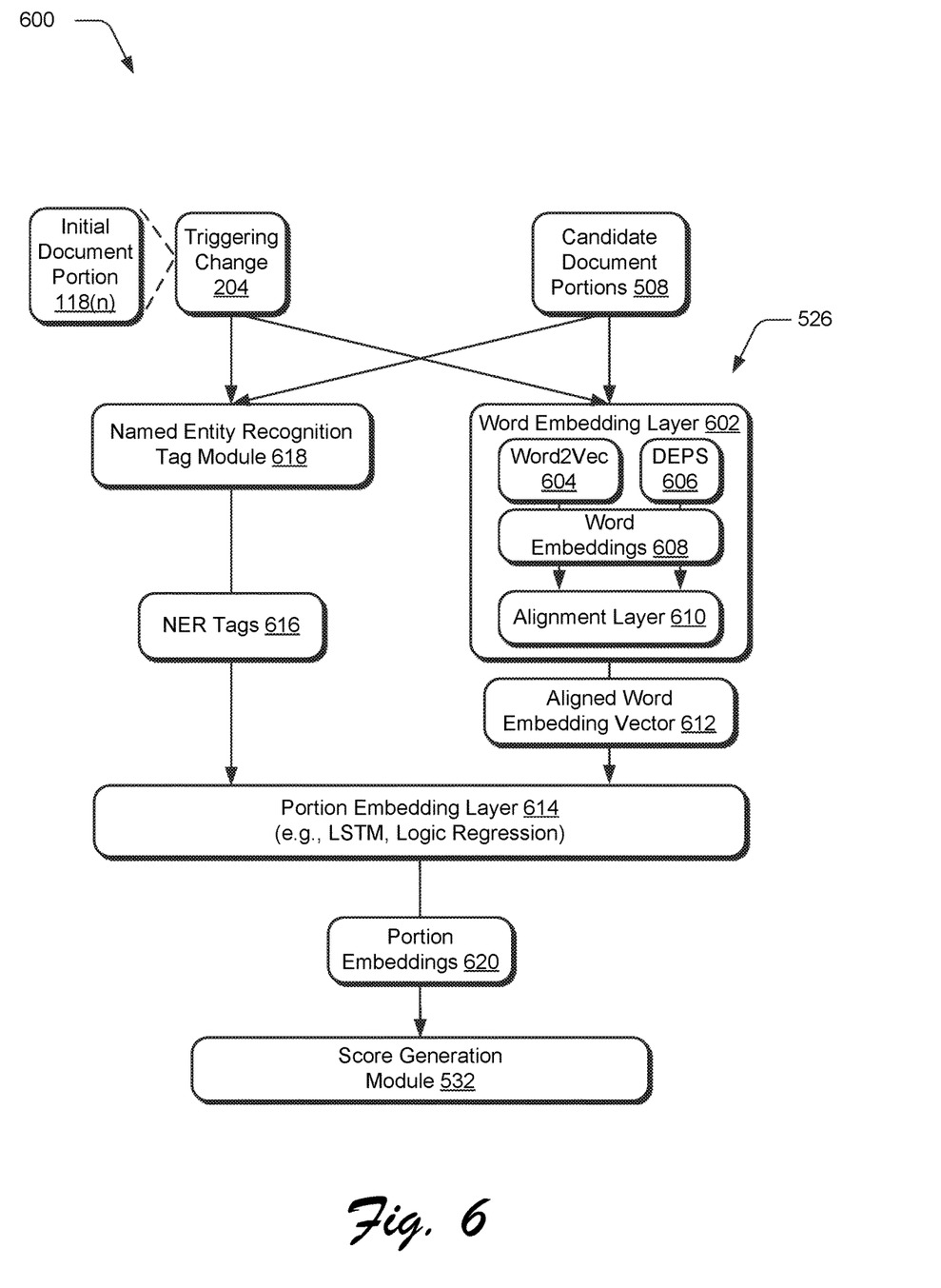
FIG. 6 depicts another example system showing operation of the trailing change module of FIG. 3 in greater detail.
Figure 7:
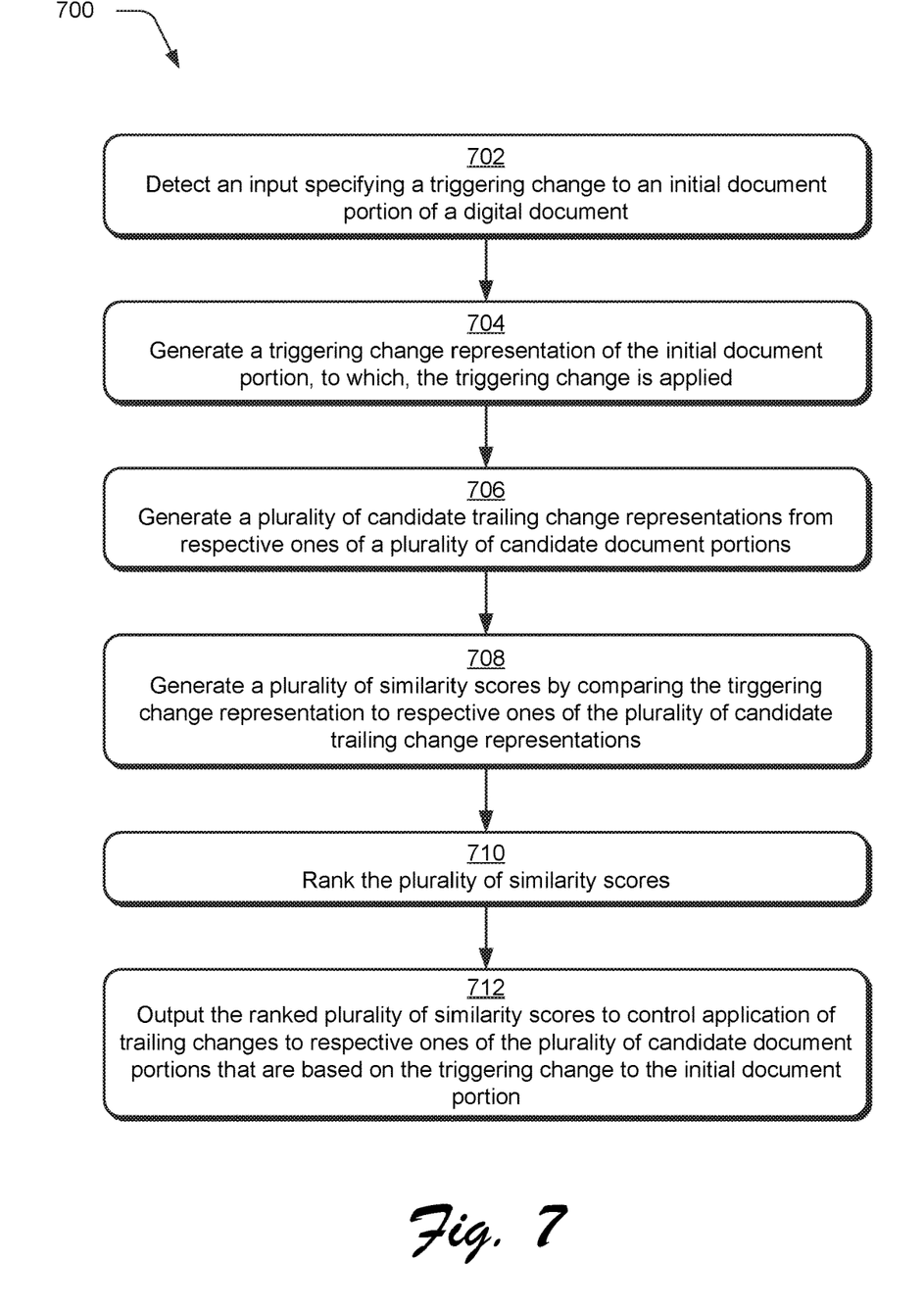
FIG. 7 is a flow diagram depicting a procedure in an example implementation in which a triggering and trailing changes are used to update a digital document.

FIG. 5 depicts a system 500 in an example implementation showing operation of a trailing change module 214 of FIG. 3 in greater detail. FIG. 6 depicts another example system 600 showing operation of the trailing change module 214 of FIG. 3 in greater detail. FIG. 7 depicts a procedure 700 in an example implementation in which a triggering and trailing changes are used to update a digital document.

As previously described, a triggering change 204 is an initial change that is made to an initial document portion 118(n), which then "triggers" trailing changes 216 to other document portions, whether within the same or different digital document. In this section, the trailing change module 214 is configured to reduce a cognitive load caused by the triggering change to maintain consistency with other document portions (e.g., defined number of characters, words, sentence, paragraph) through use of the trailing changes. In this way, the document management system 102 may support accuracy of a multitude of digital documents in real time, which is not possible to be efficiently performed manually by a user or even group of users. The document management system 102, for instance, may reduce a cognitive load on the author/editor that has just made a triggering change by presenting candidate trailing changes in a prioritized order based on similarity of candidate document portions of the initial document portion that is changed. As a result, the document management system may go beyond exact match "Find-and-Replace" type functionality to address notions of relatedness.

To begin, an input is detected specifying a triggering change 204 to an initial document portion 118(n) of a digital document 108 (block 702). The initial document portion 118(n), to which, the triggering change 204 is applied is received by a representation generation module 402. The representation generation module is configured to generate a triggering change representation 504 (block 704) as an internal representation (e.g., a numerical representation) of the initial document portion 118(n) as previously described in relation to FIG. 2. The representation generation module 502 is also configured to generate candidate trailing change representations 506 from candidate document portions 508 (block 706). Those are then used as a basis to determine similarity of the initial document portion 118(n) to respective candidate document portions 508 to determine which of the candidate document portions 508, if any, are to have a trailing change 216 applied based on the triggering change 204.

To do so in this example, a word representation generation module 510 is first employed to generate a word representation 512, e.g., from words of the initial document portion 118(n) and candidate document portions 508. A variety of techniques may be employed to generate the word representation 512 as a numerical representation of the words in the portion. In a first example, a bag-of-words module 514 is employed to generate the word representation 512 as a bag-of-words model, also known as a vector space model. In this model, a multiset (i.e., bag) of words is used that may disregard grammar and word order but may address multiplicity.

In a second example, an embedding module 516 implements an embedding-based technique (e.g., word2vec) which refers to a set of language model and feature learning techniques in natural language processing in which words from a vocabulary are mapped to vectors of real numbers to generate the word representation 512. In a third example, natural language processing module 518 is configured to implement machine learning to generate the word representation 512 from features that are learned from words of the initial document portion 118(n) and/or candidate document portions 508. In these examples, words may include individual words as well as named entities, e.g. "Adobe Systems".

The word representations 512, once generated, are then passed as an input to a portion representation generation module 520 to generate a portion representation 522 of an entirety to the initial document portion 118(n) or individual candidate document portions 508. The portion representation generation module 520, for instance, may generate the portion representation 522 using an aggregation operation by an aggregation module 525. This may be performed in a variety of ways. In one example, concatenation or averaging across the word representations 512 is used to generate the portion representation 522. In another example, a machine learning module 526 is configured to employ machine learning such that the portion representation 522 takes the sequence of the words in the word representation 512 into account. This may be performed using a variety of machine learning techniques, including use of a recurrent neural network 528, a long short-term memory 530 network, and so forth.

The portion representations 522, once generated, thus supply the triggering change representation 504 for the initial document portion 118(n) corresponding to the triggering change 204 and the candidate trailing change representation 506 for respective ones of the candidate document portions 508. This may be performed before and/or after application of the triggering change to the initial document portion. For example, if an initial document portion "X is President of the United States" (i.e., before) is changed via a triggering change "Y is President of the United States," if a triggering change representation 504 is generated using the "before" version, all document portions that are about "X" being president are within scope. If the triggering change representation 504 is generated using the "after" version, all document portions that are about "Y" being president are within scope. In some instances, both versions of the representations are used, e.g., to prioritize the candidate trailing changes.

A score generation module 532 is then configured to generate similarity scores 534 by comparing the triggering change representation to respective ones of the plurality of candidate trailing change representations (block 708). This comparison may be performed in a variety of ways, such as based on Euclidean distance, cosine similarity, and so forth. For example a Euclidean distance between the triggering change representation 504 and the candidate trailing change representation 506 may be normalized and subtracted from a value of one to generate the similarity score 524.

The similarity score 534 may be employed by the digital management system 102 in a variety of ways 102. In a first example, the similarity scores 534 are ranked by a change ranking module 218 to output candidate document portions ranked according to changes 220 for display by a display device 222. A user interface, for instance, may output corresponding candidate document portions having suggested trailing changes 216. An option may then be provided that is user selectable to make the change. In this way, the document management system 102 supports functionality to enable users to quickly locate and confirm/enter trailing changes 216, which is not possible using conventional techniques.

In another example, the similarity scores and corresponding rankings are used to indicate a degree in confidence in a corresponding trailing change 216. Therefore, similarity scores indicating at least a threshold amount of similarity may be used to cause a document transformation module 224 to generate an updated digital document 226, automatically and without user intervention, having the triggering change 204 and any trailing changes 216 that are above this threshold amount. This may be performed in a variety of ways, such as through natural language processing and understanding techniques.

FIG. 6 depicts an example machine learning system 600 of an alternative to an embedding-based approach as employed by a machine learning module 526 in which features are computed as representing the two portions, e.g., initial document portion 118(n) and a respective candidate document portion 508. These features represent not only the included content but also notions of the topical overlap between the two portions. As previously described, a size of a portion may be chosen in a variety of ways, such as sentences or paragraphs. In addition, word representation 512 and portion representation 522 components may be generic (e.g., pre-trained word2vec embeddings), or may be trained specifically for a task.

In order to train a machine learning module 526, training data is obtained by the document management system 102 that includes labelled examples containing pairs of portions that were edited together, as well as pairs of sentences which do not have this dependence. Once a machine-learning model is trained using these examples (e.g., using a loss function), this model may be deployed by the machine learning module 526 to output the candidate document portions 508 and corresponding candidate trailing changes as recommendations in a user interface that are user selectable via a corresponding option.

The system 600 includes a word embedding layer 602. The word embedding layer 602 takes as an input individual words in the content that the author is editing, i.e., the triggering change 204 and corresponding portion 118(n). Each of the words is mapped by the word embedding layer 602 to word embeddings 608, e.g., vectors of K-dimensions. Several types of word-embedding techniques may be used, examples of which include word2vec 604 and dependency-based embeddings (DEPS) 606.

The word embeddings 608 are then received as an input by an alignment layer 610. There are different embedding techniques which capture varying aspects of words in text. To harness the advantages of these varying contexts, the alignment layer 610 takes as input the word embeddings 608 created in the previous layer using different techniques (e.g. word2vec 604 and DEPS 606) and outputs an aligned word embedding vector 612. A variety of techniques may be employed to perform this alignment, an example of which is a linear transformation matrix technique.

The aligned word embedding vectors 612 are then received as an input by a portion embedding layer 614 along with corresponding named entity recognition tags 616 from a named entity recognition tag module 618 to generate portion embeddings 620. The named entity recognition tag module 618, for instance, is configured to identify a task that corresponds to the triggering change 204 and candidate document portion 508 of the trailing changes 216. Accordingly, NER tags 616 may be used to identify a type which may then be used to locate a corresponding machine-learning model of a plurality of models that are trained by the portion embedding layer 614 for the particular type. In this way, the portion embedding layer 614 may find task-specific similarity between the triggering change 204 and corresponding portion 118(n) and candidate document portions 508. A variety of machine learning techniques may be employed, examples of which including Long Short Term Memory networks (LSTMs), logic regressions, and so forth.

Embeddings are a dense vector representation of individual words. In the techniques described herein, embeddings have been shown to capture semantically rich aspects of the word and pre-trained embeddings for a vocabulary are readily available allowing the investigation of task-specific aspects. One example of an embedding techniques is word2vec 604, which relies on a notion of context such that a model is fitted to help predict a word given its context. In a default setting, word2vec is a bag-of-words model with the context therefore defined as the other words immediately surrounding the current word. A specialization of the word2vec approach is the Dependency-Based Embeddings (DEPS) 606, which defines the context of a word as the words connected to the current word in the parse tree of the sentence.

A variety of other techniques may also be employed to define and determine similarity of the initial document portion 118(*n*) and triggering change 204 to respective candidate document portions 508. In one example, entity matching is used in which each document portion in a document corpus that includes one or more entities also included in the portion 118(*n*) is considered a candidate document portion 508. A Jaccard similarity between the entity names of the two portions may be used to create an ordering In another example, Levenshtein Edit Similarity is used, which is a normalized version of a character-level edit distance between two portions and is used to indicate that the two sentences are related. An example of which is described as follows:

$$f(s_T, s_i) = 1 - \frac{LevenshteinDistance(s_T, s_i)}{\max(length(s_T), length(s_i))}$$

In an Average Word Embeddings example, a representation of a portion is obtained by taking an average of the embeddings of individual words in the portion, after removal of stop words. The dot product between the portion embeddings is used as an indicator of relatedness in this example.

In an example of Logistic Regression, all or some or the following machine learning features are computed for portion pairs (e.g., initial document portion 118(*n*) and candidate document portions 508) and combined using a logistic regression model:

Entity Matching;
Levenshtein Similarity Score;
Average of Word Embeddings;
Jaccard Similarity of Words;
Normalized count of matched n-grams (with n=3) between the two sentences;
Cosine Similarity of Sentence Vectors;
Word Order Similarity;
Substring Overlap Score: len(substr)/float(max(len(str1), len(str2)))]; and
Jaccard Similarity of POS Tags: this yields sentences with similar linguistic structure.

In an "Average Word Embeddings" example, a representation is formed by taking a sequence of words within a sentence into account. In one such example, Long Short Term Memory networks (LSTMs) are used. The structure of LSTMs is configured to handle both short range (immediately preceding words) as well as longer ranges. The model intrinsically encodes a word-by-word sequential dependence. Natural language sentences may be analyzed using a tree based structure, e.g., dependency parse trees as also known as "Tree LSTMs."

For both, LSTM & t-LSTM, a portion embedding is generated for the initial document portion 118(*n*) as well as candidate document portions 508. This may also be performed using word2vec 604 and DEPS 606 in turn, thus providing with four different portion embedding combinations. In each case, the inner product between the embedding $s_T$ & $s_i$ may be used to rank order the candidate document portions 508.

Along with word2vec vs DEPS, LSTMs vs t-LSTMs support contrast between a generic model compared with models that are a closer match to the domain of the data. In addition to the word embedding, itself, the named entity tag 616 for the word may be used to assist the portion model in capturing more linguistically relevant aspects about the word. As previously described, word2vec 604 and DEPS 606 provide complimentary information about a word. While DEPS 606 embeddings are similar for words that are functionally the same, word2vec's 604 notion of similarity is that the embeddings of words that occur in similar contexts are similar Because the techniques described herein may employ both aspects of the word, a unified representation of a word that is derived from both inputs through the alignment layer 610, as it allows for the two embeddings that had been independently produced to be used together.

The alignment layer 610, for instance, may employ an alignment model as a linear transformation via a translation plus scaling matrix, in which a matrix is used each for word2vec 604 and DEPS 606, respectively. In other words, if a pre-trained input embedding of a word is $e_i$, a matrix M is obtained such that $a_i = e_i$, with the entries of the matrix set by minimizing the following loss function:

$$L_A(e_1, e_2) = (1 - a_1^T a_2) + (1 - a_1^T e_1) + (1 - a_2^T e_2)$$

Here $e_1$ is the embedding from word2vec 604 and $e_2$ is the embedding of the same word from DEPS 606. The first term attempts to minimize a cosine similarity between the aligned versions of the embeddings, while the second two terms ensure that the aligned embedding is close to the original embedding, which is in turn word2vec and DEPS. The average of the aligned word2vec plus DEPS embedding (i.e., $$a = \frac{1}{2}(a_1 + a_2)$$

is then used as input into the portion embedding layer 614. A variety of other examples are also contemplated.

Example System and Device

Figure 8:
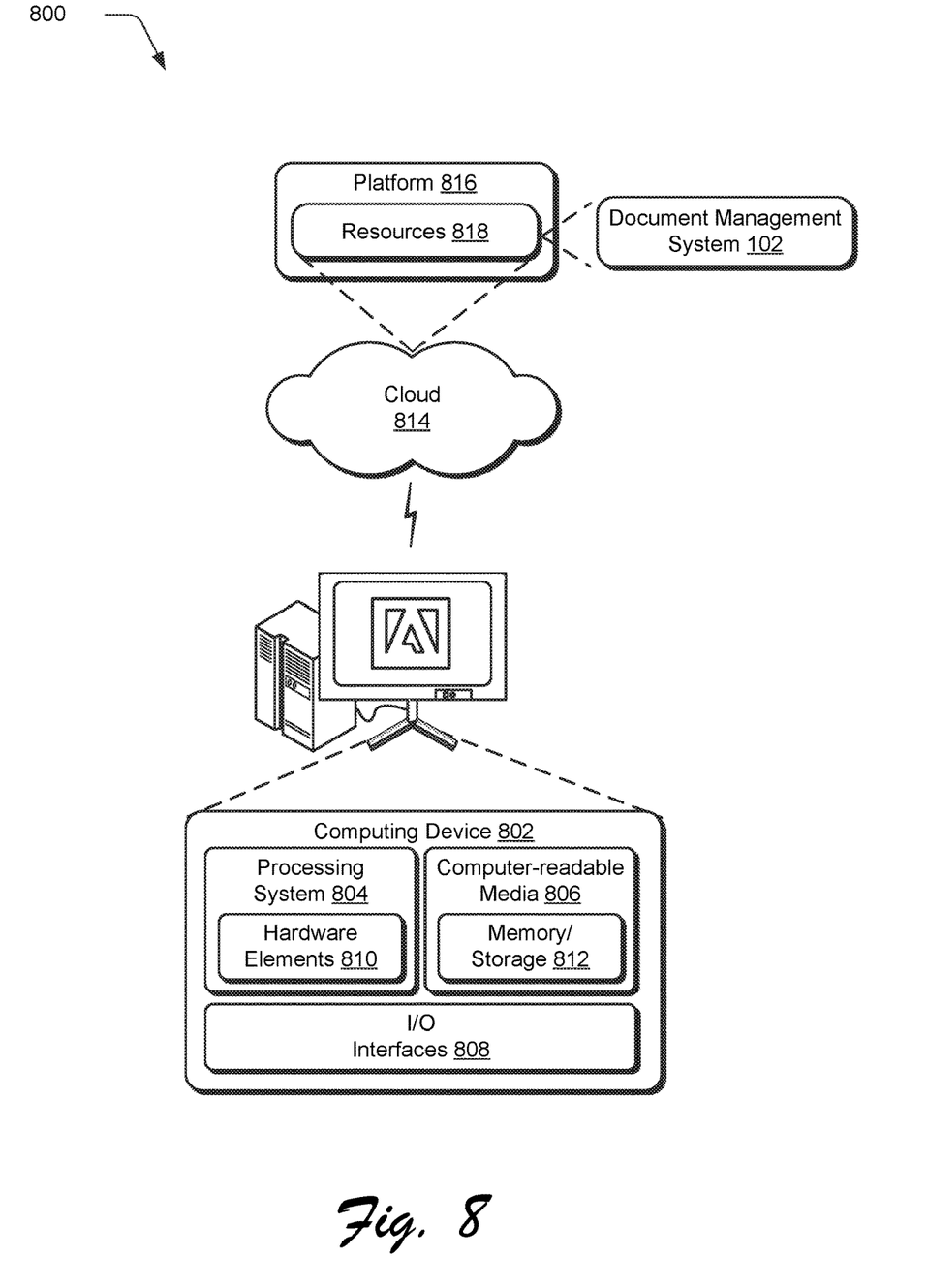
FIG. 8 illustrates an example system including various components of an example device that can be implemented as any type of computing device as described and/or utilize with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the document management system 102. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium document update environment, a method implemented by a computing device, the method comprising:
   detecting, by the computing device, an input specifying a triggering change to an initial document portion of a digital document;
   generating, by the computing device, a triggering change representation of the initial document portion;
   generating, by the computing device, a plurality of candidate trailing change representations from respective ones of a plurality of candidate document portions;
   generating, by the computing device, a plurality of similarity scores by comparing the triggering change representation to the respective ones of the plurality of candidate trailing change representations;
   ranking, by the computing device, the plurality of similarity scores; and
   outputting, by the computing device, the ranked plurality of similarity scores to control application of trailing changes to respective ones of the plurality of candidate document portions that are based on the triggering change to the initial document portion.

2. The method as described in claim 1, wherein the generating of the triggering change representation is based on the initial document portion before the triggering change is applied.

3. The method as described in claim 1, wherein the generating of the triggering change representation includes:
   generating word representations from the initial document portion; and
   generating the triggering change representation of the initial document portion by aggregating the generated word representations.

4. The method as described in claim 3, wherein the aggregating includes concatenating the generated word representations, averaging the generated word representations, or employing machine learning including a recurrent neural network or long short-term memory network.

5. The method as described in claim 1, wherein the generating of the plurality of candidate trailing change representations from respective ones of a plurality of candidate document portions includes for a respective said candidate trailing change representation:
   generating word representations from a respective said candidate document portion of the plurality of candidate document portions; and
   generating the respective said triggering change representation of the respective said candidate document portion by aggregating the generated word representations.

6. The method as described in claim 5, wherein the aggregating includes concatenating the generated word representations, averaging the generated word representations, or employing machine learning including a recurrent neural network or long short-term memory network.

7. The method as described in claim 1, wherein the generating of the plurality of similarity scores is based on Euclidean distance or cosine similarity of the triggering change representation to the respective ones of the plurality of candidate trailing change representations.

8. The method as described in claim 1, wherein the triggering change involves receipt of a user input to manually specify the triggering change to the initial document portion.

9. The method as described in claim 1, wherein the triggering change includes detecting a change, automatically and without user intervention, to a document repository outside of the digital document, the document repository identified as having subject matter that corresponds to subject matter of the initial document portion of the digital document.

10. The method as described in claim 1, wherein at least one of the plurality of candidate document portions is taken from another digital document that is different than the digital document.

11. The method as described in claim 1, wherein the triggering change involves receipt of a user input to manually specify the triggering change to the initial document portion.

12. The method as described in claim 1, further comprising applying at least one said trailing change to a respective said candidate document portion based on the ranking automatically and without user intervention using natural language processing.

13. The method as described in claim 1, wherein the outputting includes at least one option that is user selectable via a user interface to cause application of least one said trailing change to a respective said candidate document portion.

14. In a digital medium document update environment, a system comprising:
- a triggering change module implemented at least partially in hardware of a computing device to perform operations including:
  - detecting an input specifying a triggering change to an initial document portion of a digital document; and
  - applying the triggering change to the initial document portion; and
- a trailing change module implemented at least partially in hardware of the computing device to perform operations comprising:
  - generating a triggering change representation of the initial document portion;
  - generating a plurality of candidate trailing change representations from respective ones of a plurality of candidate document portions;
  - generating a plurality of similarity scores by comparing the triggering change representation to the respective ones of the plurality of candidate trailing change representations; and
  - outputting an indication of a triggering change to be made to a respective one of the plurality of candidate trailing change representations based on the generated plurality of similarity scores.

15. The system as described in claim 14, wherein the generating of the triggering change representation includes:
- generating word representations from the initial document portion; and
- generating the triggering change representation of the initial document portion by aggregating the generated word representations.

16. The system as described in claim 15, wherein the aggregating includes concatenating the generated word representations, averaging the generated word representations, or employing machine learning including a recurrent neural network or long short-term memory network.

17. The system as described in claim 15, wherein the aggregating includes concatenating the generated word representations, averaging the generated word representations, or employing machine learning including a recurrent neural network or long short-term memory network.

18. The system as described in claim 14, wherein the generating of the plurality of candidate trailing change representations from respective ones of a plurality of candidate document portions includes for a respective said candidate trailing change representation:
- generating word representations from a respective said candidate document portion of the plurality of candidate document portions; and
- generating the respective said triggering change representation of the respective said candidate document portion by aggregating the generated word representations.

19. In a digital medium document update environment, a system comprising:
- means for detecting an input specifying a triggering change to an initial document portion of a digital document;
- means for generating a triggering change representation of the initial document portion;
- means for generating a plurality of candidate trailing change representations from respective ones of a plurality of candidate document portions;
- means for generating a plurality of similarity scores by comparing the triggering change representation to the respective ones of the plurality of candidate trailing change representations; and
- means for outputting the plurality of similarity scores in a user interface to control application of trailing changes to respective ones of the plurality of candidate document portions that are based on the triggering change to the initial document portion.

20. The system as described in claim 19, wherein the outputting means includes at least one option that is user selectable via a user interface to cause application of least one said trailing change to a respective said candidate document portion.

\* \* \* \* \*